(12) United States Patent
Worrall et al.

(10) Patent No.: US 8,813,409 B2
(45) Date of Patent: Aug. 26, 2014

(54) REMOTE CONTRIVANCE REFURBISHMENT APPARATUS AND RELATED METHODS

(71) Applicants: Richard Worrall, San Diego, CA (US); William Rearick, San Diego, CA (US)

(72) Inventors: Richard Worrall, San Diego, CA (US); William Rearick, San Diego, CA (US)

(*) Notice: Subject to any disclaimer, the term of this patent is extended or adjusted under 35 U.S.C. 154(b) by 0 days.

(21) Appl. No.: 13/915,350

(22) Filed: Jun. 11, 2013

(65) Prior Publication Data

US 2014/0007483 A1    Jan. 9, 2014

Related U.S. Application Data

(63) Continuation of application No. 12/851,710, filed on Aug. 6, 2010, now Pat. No. 8,458,948.

(60) Provisional application No. 61/231,957, filed on Aug. 6, 2009.

(51) Int. Cl.
  *F41A 31/00*    (2006.01)
  *B08B 3/12*    (2006.01)

(52) U.S. Cl.
  CPC .................................. *B08B 3/12* (2013.01)
  USPC ................................................... 42/95; 15/3

(58) Field of Classification Search
  CPC .. B08B 3/12; B08B 7/0042; H01L 21/02052; H01L 21/67057; H01L 21/67028
  See application file for complete search history.

(56) References Cited

U.S. PATENT DOCUMENTS

| | | | |
|---|---|---|---|
| 7,866,247 B2 * | 1/2011 | Son et al. | 89/27.3 |
| 7,895,930 B2 * | 3/2011 | Fisk et al. | 89/1.1 |
| 2001/0023700 A1 * | 9/2001 | Drayer et al. | 134/1.3 |

* cited by examiner

*Primary Examiner* — Samir Abdosh
(74) *Attorney, Agent, or Firm* — John K. Buche; Buche & Associates, P.C.

(57) ABSTRACT

Disclosed is a remote contrivance refurbishment apparatus and related methods.

20 Claims, 5 Drawing Sheets

REMOTE CONTRIVANCE REFURBISHMENT APPARATUS AND RELATED METHODS

CROSS-REFERENCE TO RELATED APPLICATIONS

This application is a continuation of U.S. application Ser. No. 12/851,710, filed Aug. 6, 2010, now allowed, which claims benefit of priority to U.S. provisional application Ser. No. 61/231,957, filed Aug. 6, 2009. The disclosures of these documents are incorporated herein by reference in their entirety.

STATEMENT REGARDING FEDERALLY SPONSORED RESEARCH OR DEVELOPMENT

Not applicable.

BACKGROUND OF THE INVENTION

1. Field of Invention

This invention is in the field of apparatuses and methods for remote automated contrivance refurbishment.

2. Background of the Invention

Various contrivances (including but not limited to assault rifles) are employed and operated worldwide. Often, it is necessary to refurbish the contrivances at exotic or remote locations wherein refurbishment know-how, repair diagnosis, spare/replacement parts, or cleaning solutions are not readily available. Moreover, frequently a plurality of similar contrivances at the remote locations may simultaneously need refurbishment or repair. Conventional refurbishment under these circumstances has been accomplished in one of three ways: (1) on-site manual refurbishment; or, (2) transmitting the subject contrivances off-site for refurbishment; or, (3) outright replacement of the subject contrivance.

Conventional refurbishment methods have typically been inadequate. First, on-site personnel may be sparse whereby work-efforts cannot affordably be expended on refurbishment. Second, the delivery of customized replacement packages (including refurbishment parts and cleaning solutions) to the remote site is often expensive. Third, retrieving a subject contrivance from a remote site may entail excessive expenses. Finally, replacing the subject contrivance may be unnecessarily wasteful, as the contrivance would operate sufficiently if merely refurbished.

SUMMARY OF THE INVENTION

Accordingly, it is an object of the present invention to provide an apparatus and the associated methods for remotely and automatedly refurbishing contrivances, including but not limited to assault rifles.

It is an object of the present invention to provide an apparatus and the associated methods for remotely and automatedly refurbishing contrivances wherein refurbishment know-how, repair diagnosis, spare/replacement parts, and cleaning solution are performed by the apparatus.

It is an object of the present invention to provide an apparatus and the associated methods for remotely and automatedly refurbishing contrivances wherein human involvement in the refurbishment process is minimized, and wherein speed is maximized.

BRIEF DESCRIPTION OF THE FIGURES

Other objectives of the invention will become apparent to those skilled in the art once the invention has been shown and described. The manner in which these objectives and other desirable characteristics can be obtained is explained in the following description and attached figures.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Generally, the apparatus of the present application is for remotely and automatedly refurbishing contrivances. In other words, the apparatus may be delivered to remote locations (including outer space) for the automated refurbishment of contrivances, such as weapons. For purposes of this application, "refurbish" and "refurbishment" shall include but not be limited to cleaning. The apparatus is preferably transported to the remote location via pick-up truck (whether in the bed or otherwise), truck and trailer, railcar, boat, air-drop, or airplane, or spaceship.

Basic apparatus operation begins with the input of at least one contrivance and ends with the output of a refurbished, or cleaned, contrivance. More specifically, operation of the apparatus is generally as follows. Initially, the apparatus determines (or is told) the identity of a contrivance provided thereto. Identification of the contrivance preferably triggers the apparatus' performance of a contrivance specific disassembly routine. Via a computer means, the apparatus programmatically inventories/examines the parts of the disassembled contrivance and discards any expired parts. The apparatus delivers the disassembled parts (excluding expired parts) to an internally contained solution for ultrasonic cleaning. The apparatus supplements the cleaned contrivance parts, if necessary, with replacement parts from pre-sorted and self-contained bins before the apparatus performs a contrivance specific assembly routine. The apparatus examines the reassembled contrivance for compliance with the contrivance's specifications and tolerances. Noncompliant and intolerant parts are repaired or replaced by the apparatus via either repair specific routines or via contrivance specific disassembly, part replacement, and reassembly routines. After compliance with the contrivance's specifications and tolerances is assured, the refurbished contrivance is output from the apparatus.

Figure 1:
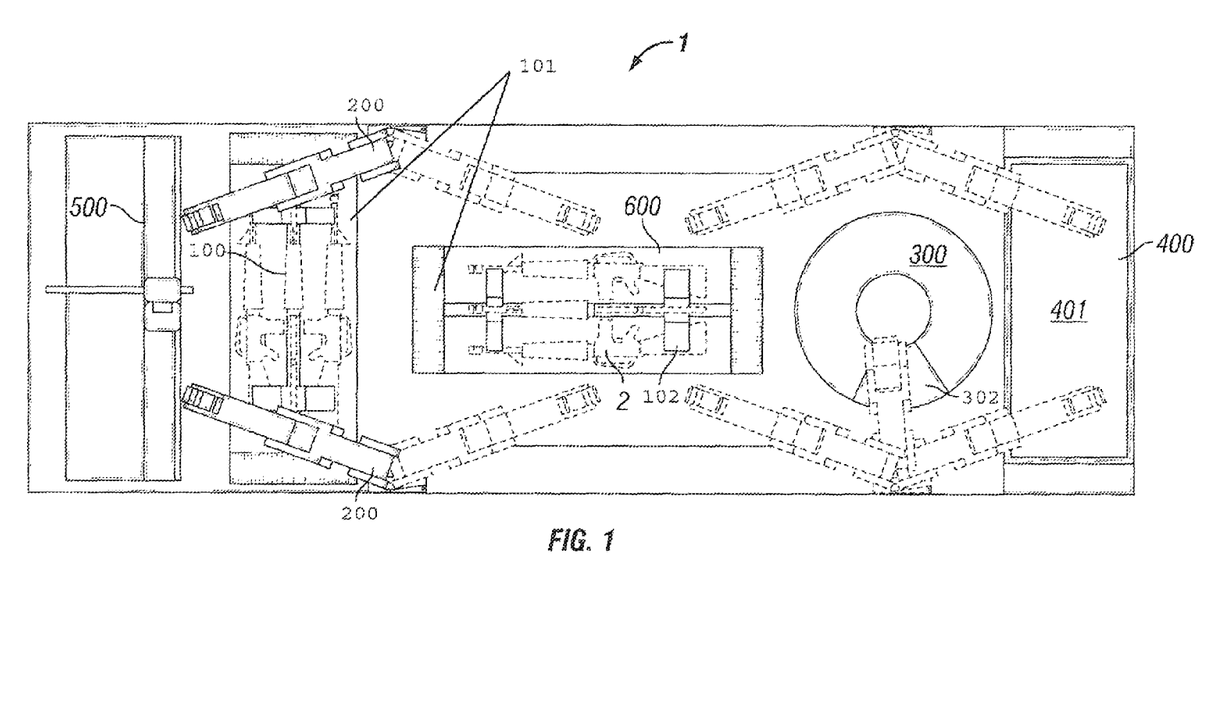
FIG. 1 is a top view of the apparatus 1 of the present application.

FIG. 1 depicts a top view of a preferable embodiment of the apparatus 1 of the present application. As seen in the figure, the apparatus 1 preferably comprises the following subassemblies: a cache 100; paired and opposable robotic arms 200; a multi-level, multi-compartment, rotating tool and part bins 300; an ultrasonic cleaning tub 400; a coordinate-measuring machine 500 station; and, a reassembly station 600. It should be noted that the cache 100 and the reassembly station 600 could be the same subassembly, wherein the cache 100 has been automatically rotated and moved to the reassembly station 600 location via a conveyor belt or other conveying means within the apparatus 1. The subassemblies are preferably positioned whereby said cache 100, rotating bins 300, cleaning tub 400, coordinate-measuring machine 500, and reassembly station 600 are within the work envelope or range of each robotic arm 200.

Figure 2:
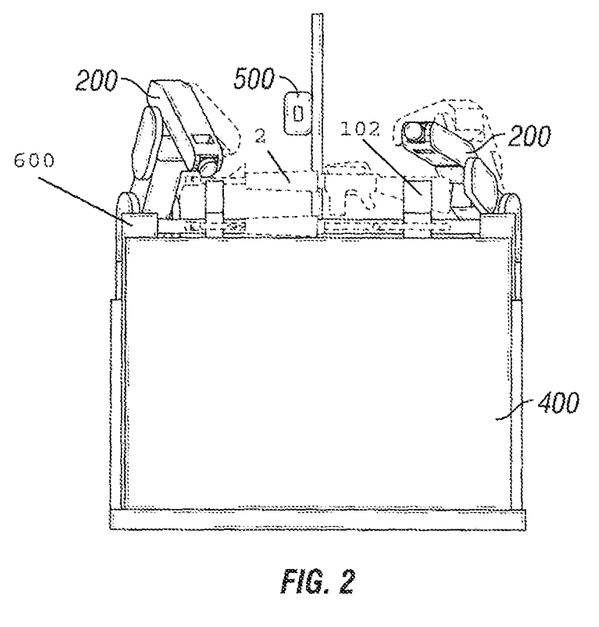
FIG. 2 is a side view of the apparatus 1 of FIG. 1.
Figure 3:
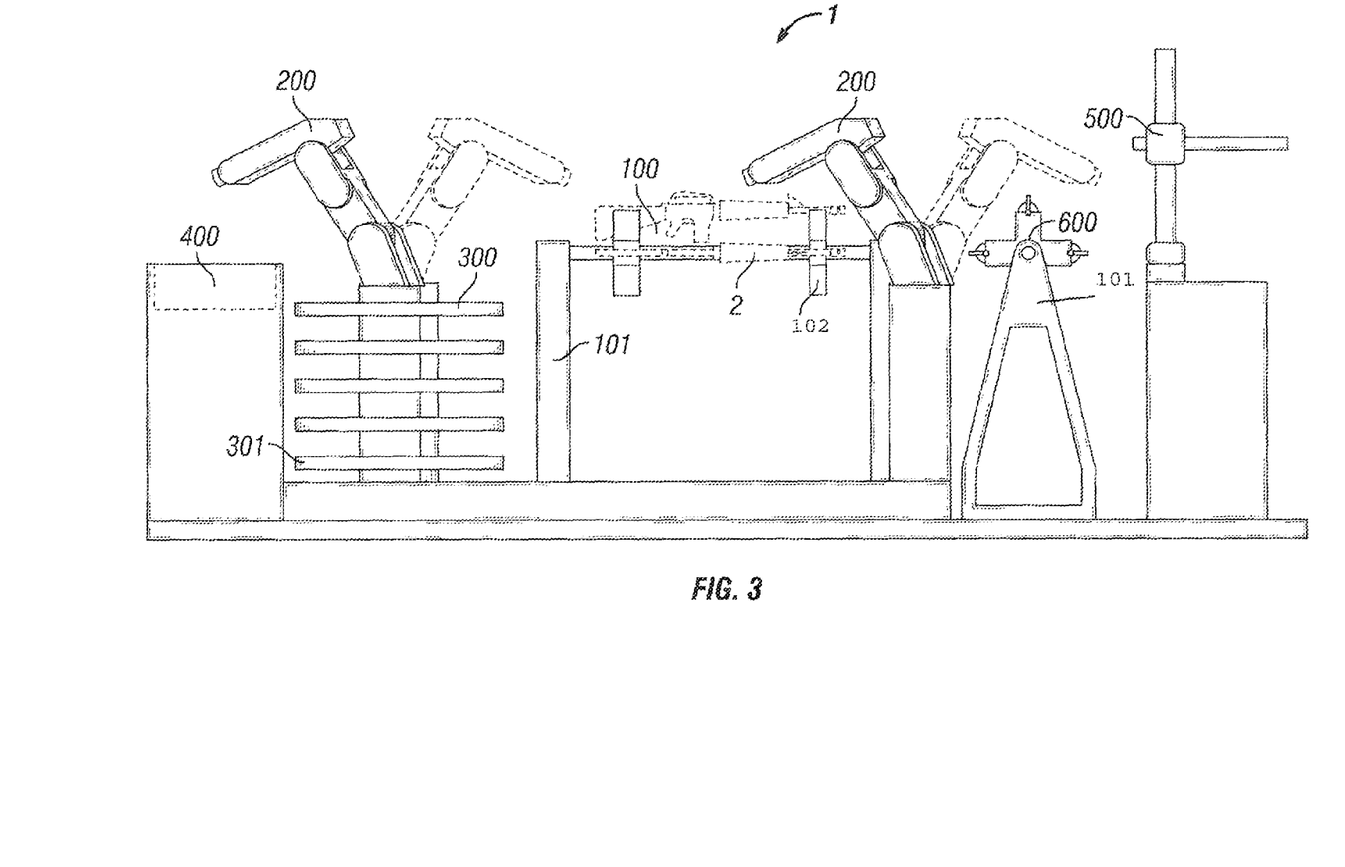
FIG. 3 is a front view of the apparatus 1 of FIGS. 1 and 2.

FIGS. 2 and 3 are respectively side and front perspectives of the apparatus 1 depicted in FIG. 1. In other words FIGS. 1 through 3 depict the apparatus 1 from different views and thus together better illustrate the subassemblies composing the same. Viewed in conjunction, FIGS. 1 through 3 provide a more complete overview of the apparatus 1, which could be a feature of a wheeled carrier, truck, train car, boat, or air drop.

Referring to FIGS. 1 through 3, the cache 100 is an area for receiving contrivance 2. Typically, at least one contrivance is provided to the cache 100 whereby the cache 100 systematically provides the input contrivances to the apparatus 1 for refurbishment. The cache 100 is composed of a stand 101, and a contrivance mounting means. In the most minimal embodiment, the stand 101 features a single mounting means which, as discussed below in connection with the refurbishment of a rifle, inserts into the clip port to support the rifle. In the present embodiment, the mounting means comprises grips 102. Input contrivances 2 are suitably collected in the cache 100 and systematically presented for refurbishment at the stand 101. Although discussed in more detail below, the stand 101 is sometimes defined by a plurality of radially spaced grips 102 controllably rotatable around a central axis. Preferably, the stand 101 simultaneously: (1) gathers contrivances 2 from the technician, (2) presents a contrivance 2 for refurbishment, and (3) releases a refurbished contrivance to the output. Each grip 102 on the stand 101 performs the stated functions relative to its position during stand 101 rotation.

Although FIGS. 1 through 3 depict the stand 101 as being defined by a plurality of radial spaced grips 102, it is contemplated that other means for securing the contrivance 2 to the stand 101 may be employed until, as discussed below, the disassembly of the contrivance 2 is initiated. For example, if the contrivance is a rifle, the means for presenting the rifle for refurbishment may preferably be a mounting bracket that mimics a standard rifle clip and supports the rifle to the stand via the clip port in the rifle's lower receiver. In a minimal embodiment, the cache 100 features a plurality of mounting brackets for various types of rifles, said mounting brackets radially extending from an axis. An operator of the apparatus 1 may communicate the type of rifle to the apparatus and the cache 100, via a computer means on the apparatus, will select the appropriate mounting bracket and rotate it into the proper position.

As mentioned above, the cache 100 may be stationary or move throughout the apparatus 1 to the reassembly station 600 location via rotation and transport on a conveyor belt or other conveying means.

Still referring to FIG. 1 through 3, the robotic arms 200 are preferably for performing refurbishment and repair routines (including disassembly and assembly routines). Preferably, the robotic arms 200 are six-axis robots for automated control in three spatial dimension, roll, yaw, and pitch. However, it is contemplated that other preferable designs of the present apparatus 1 may trade freedoms of motion for cost, speed, and/or accuracy depending on the contrivance 2 to be refurbished or repaired.

As depicted in the FIGS. 1 and 3, the robotic arms 200 are generally movably located along the length of the apparatus 1. Via movement of the robotic arms 200 along the apparatus 1, the working envelope of each robotic arm 200 may preferably contain the cache 100 (including the stand 101), the rotating bins 300, the cleaning tub 400, the coordinate-measuring machine 500 station, and the reassembly station 600. Movement of the respective robotic arms 200 along the apparatus may be accomplished by motor-plus-chain, motor-plus-track, conveyor belt, and the like.

As discussed below, it is contemplated that the robotic arms 200 will suitably: (1) work in conjunction with each other for performing refurbishment and repair routines/tasks/routine steps (including disassembly and assembly routines) that require two cooperating appendages; (2) work alone in conjunction with the stand 101 or other support for performing steps that require a single appendage for performing routines/tasks/routine steps; (3) work in conjunction with the rotating bins 300 for obtaining tools necessary for performing routines/tasks/routine steps; and (4) work in conjunction with the rotating bins 300 for obtaining necessary contrivance 2 replacement parts.

Referring now to FIGS. 1 and 3, the rotating bins 300 are for systematically organizing and providing tools or replacement parts to the robotic arms 200 during refurbishment and repair routines/tasks/routine steps (including disassembly and assembly routines). Preferably, the rotating bins 300 features stacked levels 301 of radially spaced sub-bins, rotatable around a central pivot. Each level preferably contains a false bin 302 whereby the robotic arm 200 may reach, top down (as depicted in FIG. 1), into the bin level immediately below the false bin 302. Aligning the false bins 302 from multiple levels suitably permits the robotic arm to reach into the lowest level of the rotating bins 300.

Still referring to the rotating bins 300, each sub-bin within the rotating bins 300 system will preferably be designated by a radial coordinate and level 301. Also, each sub-bin will preferably be assigned a particular tool or part depending on the particular function of the apparatus 1. If and when a particular tool or part becomes necessary to a routine or routine step performed by the robotic arm 200, then the rotating bins 300 programmatically rotate (under the command of a computer means) for presenting the appropriate sub-bin to the robotic arm 200. Ideally, if the appropriate sub-bin occupies a lower level, then all upper levels 301 correspondingly rotate so as to position the higher false bins 302 above the appropriate sub-bin. Preferably, and as depicted in FIG. 1, the robotic arm 200 access is the closest radial coordinate on the associated rotating bins 300.

Referring once again to FIGS. 1 through 3, the cleaning tub 400 is for deeply cleaning and/or cleaning the disassembled parts of the contrivance 2. Preferably, the cleaning tub 400 cleans parts via ultrasound. Suitably, the robotic arms 200, under the command of a computing means, orderly and coordinately position the parts of disassembled contrivances 2 along the basin 401 of the tub 400 (with cleaning solution prefilled or filled later). After cleaning, the robotic arms 200 orderly and coordinately retrieve the contrivance 2 components according to the coordinate memory of part placement.

Referring again to FIGS. 1 and 2, the coordinate-measuring machine 500 station is for checking the specifications, gauges, tolerances, and other measurable dimensions of the refurbished contrivance 2. Preferably, the coordinate-measuring machine 500 is a horizontal coordinate-measurement device for touch sensing measurements.

Referring still to FIGS. 1 through 3, the reassembly station 600 is for reassembling the disassembled contrivance. The reassembly station 600 interacts with the contrivances 2 and the robotic arms in a similar manner as the cache 100. Before, during, or after the robotic arms 200 perform the reassembly routines, the refurbished contrivances or sub components are provided to the coordinate measuring machine 500 as discussed above. If the contrivance 2 or subparts are determined to be in compliance with the specifications, gauges, tolerances, and other measurable dimensions or criteria, then the contrivance 2 or subparts are returned to the reassembly routine and provided to the apparatus 1 output, or else the contrivance 2 or subparts are returned to the reassembly station 600 to undergo repair. In the most minimal embodiment, a reassembly station is not necessary because, as discussed above, the cache 100 may be used to replace the reassembly station.

In one particular mode of operation, the apparatus 1 is adapted for the refurbishment of a rifle contrivance (e.g., the AR-15, or M4, or AK-47, and the like). In this particular mode of operation a rifle is: provided to the cache 100; presented to the robotic arms 200 for take-down at the stand 101; expired rifle parts are discarded; unexpired rifle parts are introduced to the cleaning tub 400 for cleaning while replacement parts are retrieved by the robotic arms 200 from the rotating bins 300; the rifle is reassembled at the stand 601 and provided to the coordinate-measuring machine 500 for checking the rifle's specifications and tolerances; and, finally the refurbished rifle is output from the apparatus 1. Below is a more detailed description of the manner by which the apparatus 1 refurbishes a rifle (e.g., the AR-15 or M4 or AK-47, and the like).

Setup.

First, the apparatus 1 is delivered to a remote location via train, boat, plane, vehicle, or space craft. For example, the apparatus 1 may occupy a truck bed whereby delivery of the apparatus is accomplished via driving the truck to the remote location. For another example, the apparatus 1 may occupy a shipping container whereby delivery of the apparatus is accomplished via fly-by parachuted drop-off to the remote location. Next, the apparatus 1 is provided a power source, whether via gas generator, electrical input, or others. Finally, the apparatus should be powered-on. In the preferable embodiment, the power source preferably provides the energy necessary to operate the hydraulics, pumps and other mechanisms of the apparatus 1.

Operation.

First, at least one rifle 2 is input to the apparatus 1 at the cache 100 by an operator or technician. In the preferable embodiment, the rifle 2 is orientedly input to the cache 100 whereby the stand 101 may readily grip the rifle stock and rifle muzzle. In an alternate embodiment, the operator or technician provides the rifle 2 to the apparatus via inserting a weapon mount on the stand 101 into the clip port of the rifle 2. Input rifles 2 are gripped and presented to the robotic arms 200 for refurbishment. It is contemplated that many types of rifles 2 may be refurbished via the apparatus 1. To accommodate the diverging dimensions and sizes of the many rifle types, the apparatus 1 preferably features a manual selection mechanism whereby the operator/technician may indicate to the apparatus 1 which type of rifle 2 will be input to the machine whereby a computer means automatedly adjusts the stand to the specific rifle 2 (i.e., the computer means selects a compatible weapon mount with the rifle 2 clip port or adjusts the grips to the dimensions of the rifle 2). In addition to selecting the appropriate weapon mount, the computer means also commands the robotic arms during the disassembly and reassembly routines based on the manual selection of rifle type.

Normally, an unloaded rifle will be provided to the apparatus 1 with the clip out, especially if a clip mount is used instead of the grips 102. However, it is also contemplated that the apparatus 1 may unload the rifle 2 programmatically. A preferable rifle 2 unloading routine is performed by the robotic arms 200 after presentment of the rifle 2 at the stand 101. Initially, a first robotic arm 200 activates the clip release button while the second robotic arm 200 grips (using a clamping tool head from the rotating bins) the clip and disengages the clip from the clip socket in the lower receiver of the rifle. Next, the first robotic arm 200 fully extends the charging handle to open the bolt and eject any round from the chamber. The step of ejecting rounds from the chamber may be repeated for the known number of rounds customarily maintained in the chamber during rifle 2 use.

Preferably, after the rifle has been provided to the cache 100, the cache 100 rotates within the apparatus 1 and moves to the reassembly station 600 location via a conveyor means, such as a belt, to a central location in the apparatus 1. After the cache 100 has moved into the reassembly station 600 position, the refurbishment routines may be performed by the robotic arms 200 under the command of a computer means.

Typically, the first step of a rifle 2 disassembly routine is removing the butt stock from the upper and lower receiver assembly. Initially, the first robotic arm 200 rotates the takedown lever 160 deg. counter-clockwise. Next, the first robotic arm 200 preferably grasps the rifle butt stock while the second robotic arm 200 suitably grasps the upper and lower receiver assembly. The components are disengaged by drawing the robotic arms 200 and associated components in opposite directions along the rifle 2 plain. Once disengaged, the first robotic arm 200 preferably places the butt stock in the cleaning tub 400 or in the appropriate sub-bin in the rotating bins 300. Finally, while the upper and lower receiver assembly is still gripped by the second robotic arm 200, the first robotic arm 200 unscrews and disengages the recoil tube 1301 therefrom. Subsequently, the recoil tube 1301 is preferably placed in the cleaning tub 400 or corresponding sub-bin within the rotating bins 300.

The second step of a rifle 2 disassembly routine is separating the upper and lower receivers. First, a double appendaged small diameter drive tool is obtained from the appropriate sub-bin within the rotating bins 300 by the first robotic arm 200. Next, the two appendages of the tool are respectively directed to the first and second takedown pins on the lower receiver, whereby the takedown pins and are simultaneously moved from left to right until attainment of the unlocked position. Thereafter, the first robotic arm 200 returns the double-appendaged tool to the appropriate sub-bin in the rotating bins 300. Next, the first robotic arm 200 grips the upper receiver 1200 and the second robotic arm 200 grips the lower receiver wherein the robotic arms 200 disengage the upper 1200 and lower 1100 receivers via drawing the respectively gripped components in opposite directions within the vertical rifle 2 plain. Preferably, the lower receiver is coordinately placed in the cleaning tub 400 by the second robotic arm 200.

The third step of a rifle disassembly routine is removing the muzzle compensator. First, with the first robotic arm 200 still holding the upper receiver, the second robotic arm 200 grips the locking ring and pulls it forward (i.e., toward the muzzle) for enabling muzzle compensator detachment. Detachment is completed by the second robotic arm 200 gripping the muzzle compensator and drawing the compensator away from the upper receiver with a concurrent twisting motion relative thereto. Preferably, the muzzle compensator is coordinately placed in the cleaning tub 400 by the second robotic arm 200.

The preferable fourth step of a rifle 2 disassembly routine is removing the bolt carrier assembly. The bolt carrier assembly is preferably removed by the second robotic arm 200 pulling the charging handle out of the back of the upper receiver. The charging handle may be thereafter placed in the cleaning tub 400.

Preferably the apparatus 1 need not break down the rifle any further. However, it is contemplated by the inventors that the apparatus is capable of breaking down the subcomponents of the rifle. For example, the robotic arms 200 may perform disassembly routines for the bolt carrier assembly after its removal from the upper receiver. Initially, while the first robotic arm 200 holds the carrier assembly, the second robotic arm 200 pushes the bolt into the locked position. Next, the second robotic arm 200 removes the firing pin retaining pin from its diametrical position within the assembly by gripping the closed end, preferably using needle pliers (or the equivalent) and drawing the retaining pin from the side of the assembly. Preferably, the needle nose pliers may be retrieved from the rotating bins 300 as discussed above. The pin 1502 may be placed in the cleaning tub 400 after its removal.

Still referring to a breakdown of the bolt carrier assembly, with the firing pin retaining pin removed from the assembly, the first robotic arm 200 suitably rotates the orientation of the bolt assembly to remove the firing pin. The firing pin is typically coaxially positioned within the bolt and bolt carrier assembly. By orienting the assembly with the bolt end vertically positioned, the firing pin suitably drops out of the assembly. The firing pin may preferably be caught by the second robotic arm 200 using a cup tool previously retrieved from the rotating bins 300 as discussed above.

Yet still referring to a breakdown of the bolt carrier assembly, the bolt carrier assembly is further disassembled via removing the bolt cam pin. The bolt cam pin is located on the periphery of the assembly. While the first robotic arm 200 continues to grip the bolt carrier assembly, the second robotic arm 200: (1) grips the cam pin head; (2) rotates the cam pin by one-quarter turn; and, (3) pulls the cam pin from its socket.

Continuing the breakdown of the bolt carrier assembly, with the cam pin removed from the bolt carrier assembly, the bolt may suitably be disengaged from the bolt carrier assembly. The second robotic arm 200 preferably grips the bolt and coaxially removes the bolt from the bolt carrier assembly. With the bolt thus removed, the bolt carrier assembly may be coordinately placed in the cleaning tub 400 for cleaning.

The robotic arms 200 may also perform disassembly routines for the bolt. Initially, a first robotic arm 200 grips the bolt while the second robotic arm 200 secantly pushes the extractor pin through the bolt using a punch tool from the rotating bins 300. Preferably the extractor pin is discharged from the bolt assembly into a catch or bucket before coordinate placement in the cleaning tub 400. After returning the punch tool to the rotating bins 300, the second robotic arm grips (whether independently or via pliers from the rotating bins) grips the extractor and spring and disengages the set from the bolt assembly. At this point, the first robotic arm 200 preferably places the bolt coordinately in the cleaning tub 400. Finally, the extractor and spring are preferably separated and coordinately placed in the cleaning tub 400.

At any point, expired parts of the disassembled rifle 2 are discarded instead of placed in the cleaning tub 400. For example, the firing pin firing pin may have a firing limit of one-million rounds or useful life of 15 years and, after the limit is exceeded the firing pin is discarded and replaced.

Reassembly routines are preferably the reverse of the above stated disassembly routines. Generally, parts are removed from the cleaning bins 400 in the order of assembly.

Figure 4A:
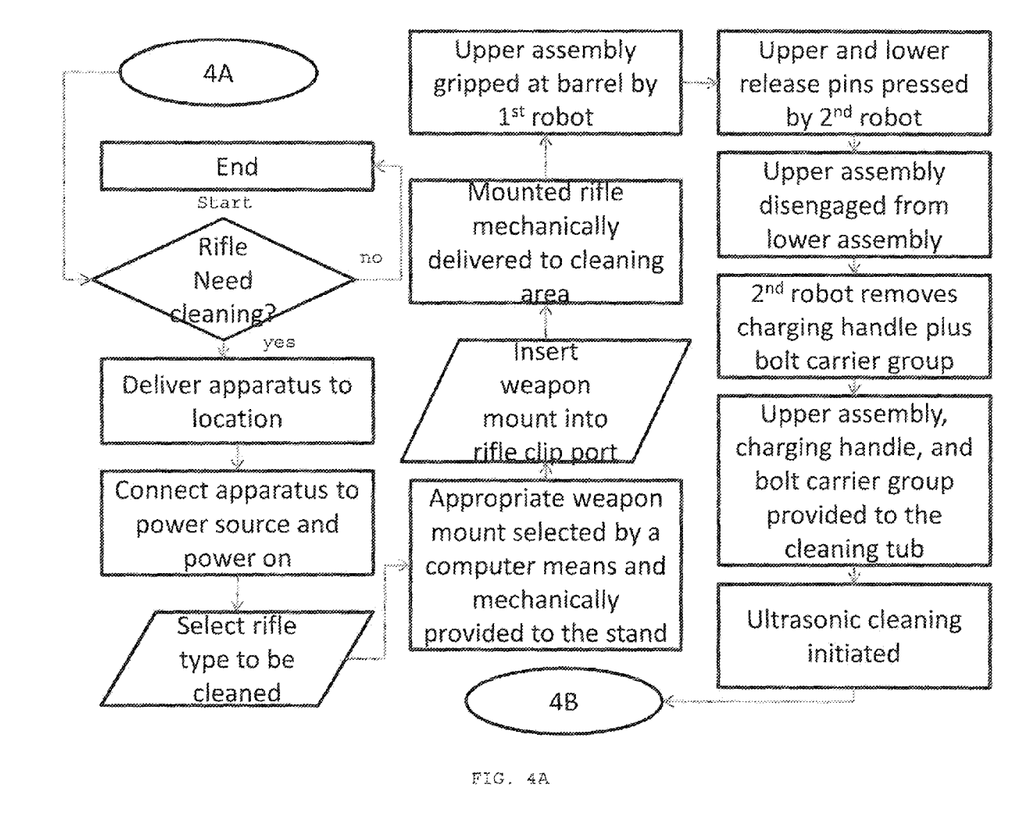
FIG. 4A is a flowchart for cleaning a rifle using the apparatus 1 of the present invention.
Figure 4B:
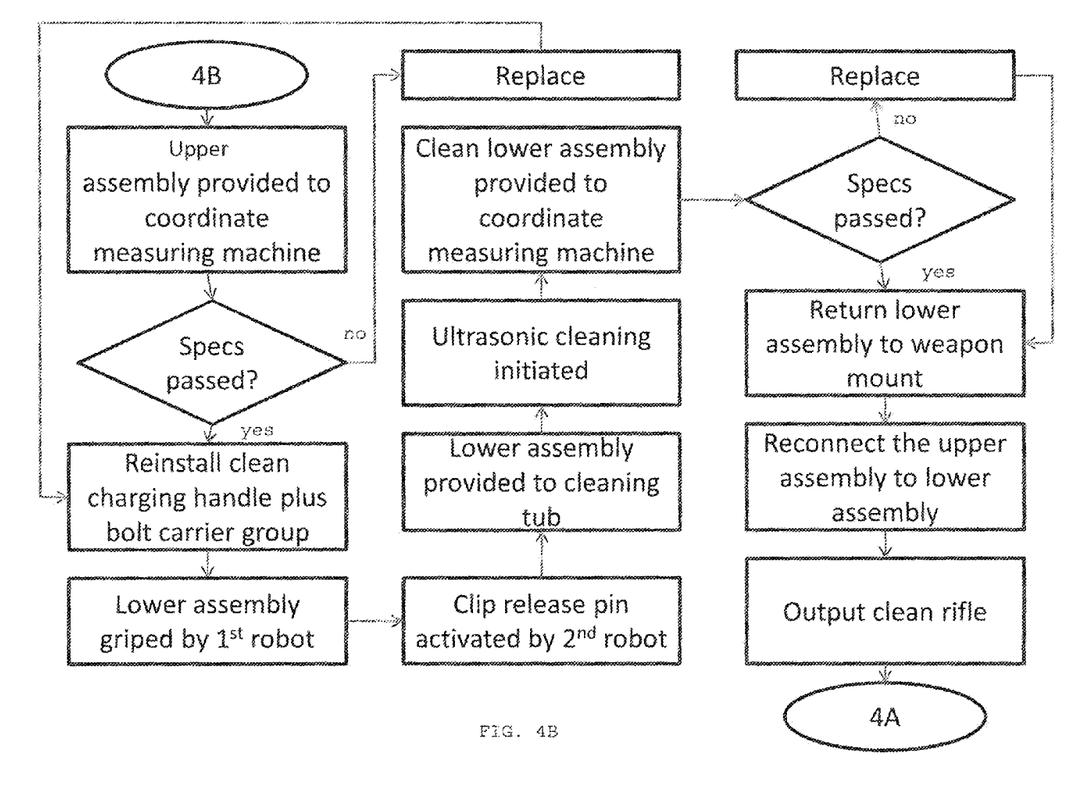
FIG. 4B is a flowchart for replacing distressed parts of a rifle.

In a minimal embodiment of the apparatus 1 and the related methods, refurbishment of a rifle requires fewer steps. A method is illustrated by the flowchart of FIGS. 4A and 4B. First, the apparatus 1 is preferably powered on as discussed above. Second, a rifle type is communicated to the apparatus 1. Automatically, the apparatus 1, via a computer means, selects the appropriate weapon-mounting bracket for the cache 100 and sends the corresponding disassembly and reassembly routines to the robotic arms 200. Third, the technician or soldier places the rifle on to the weapon-mounting bracket. Fourth, the cache 100, rifle, and mounting bracket move into the work envelope of the robotic arms 200 via a conveyor belt. Fifth, a first robotic arm 200 grabs the upper assembly at the barrel with a clamping tool head previously obtained from the rotating bins 300. Sixth, a second robotic arm 200, with a probe tool head from the bins 300, presses out the upper assembly upper release pin. Seventh, the first robotic arm 200, pivots the upper assembly downward while the second robotic arm 200 presses out the upper assembly lower release pin. Eighth, the first robotic arm 200 then separates the upper assembly from the lower assembly. Ninth, while the lower assembly is still secured to the weapon-mounting bracket and the upper assembly securely held by the first robotic arm 200, the second robotic arm 200, using a cradled-bottom with two-clawed clamping tool head, removes the charging handle and bolt carrier group and coordinately places them into the cleaning tank 400. Tenth, the first robotic arm places the upper carrier assembly into the cleaning tank 400. Eleventh, after cleaning is complete, the upper carrier is removed from the cleaning tank by the first robotic arm 200 and delivered to the coordinate measuring machine 500 where tolerances are checked. Twelfth, if specifications and tolerances are compliant, the cleaned charging handle plus bolt carrier group are installed and the upper assembly is set to the side. Thirteenth, the lower assembly is released from the weapon mounting bracket by the first robotic arm 200 clamping onto the lower assembly and lifting the assembly upward while the second robotic arm 200 presses the clip release button. After its release, the lower assembly is placed in the cleaning tank 400 by the robotic arm 200. Fourteenth, after cleaning is complete, the lower assembly is retrieved from the cleaning tub 400 by the first robotic arm 200 and moved to the coordinate measuring machine 500 for tolerance testing. Fifteenth, if the specifications and tolerances are compliant with the standard, then the lower assembly is returned to the mounting bracket by the first robotic arm 200 and engaged thereto at the clip port. Next, the tolerance compliant upper receiver is reunited with the lower assembly by the robotic arms 200. Finally, the rifle, the cache 100 and mounting bracket move to the original location where the soldier or technician removes the rifle from the cache 100.

An additional aspect of the present invention is the ability of the robotic arms to cut and weld metals during contrivance repair or refurbishment routines. In such an instance, the robotic arms will retrieve welding and cutting instruments and tools from the rotating bins 300. Alternatively, a welding or cutting tool could be manually attached to the robotic arms by a technician. Such a cutting and welding tool could be in the embodiment of an arc welder or other type of welding and cutting tools known to one skilled in the art of welding. In other words, it is contemplated that the robotic arms 200 may be adapted to spot weld, solder, and cut and grind.

It should be noted that the figures and the associated descriptions are of illustrative importance only. In other words, the depictions and descriptions of the present invention should not be construed as limiting of the subject matter in this application. The apparatuses, assemblies, components, order and inclusion of steps, and methods discussed hereby are susceptible to modification without changing the overall concept of the disclosed invention. Such modifications might become apparent to one skilled in the art after reading this disclosure.

In summary, what is disclosed is an apparatus for remotely cleaning a rifle, comprising: a rifle mounting means; a means for automatedly disassembling a rifle; a means for cleaning rifle components; a means for checking the specifications of a rifle component; a means for refurbishing said rifle and replacing or cleaning components not within said specifications; and, a means for reassembling a rifle.

Also disclosed is a method of cleaning a rifle comprising the steps of: delivering an apparatus for remotely cleaning a rifle, said apparatus comprising a rifle mounting means, a means for automatedly disassembling a rifle, a means for cleaning rifle components, a means for checking the specifications of a rifle component, a means for refurbishing said rifle and replacing or cleaning components not within said specifications, and a means for reassembling a rifle; providing a power source to said apparatus; providing a rifle to a mounting means; disassembling said rifle via said means for automatedly disassembling a rifle into an upper assembly, a charging handle plus bolt carrier group, and a lower assembly; cleaning said upper assembly, said charging handle plus bolt carrier group, and said lower assembly via said means for cleaning rifle components; checking the specifications of said upper and lower assemblies via said means for checking the specifications and tolerances of a rifle component; and, reassembling said upper assembly, said charging handle plus bolt carrier group, and said lower assembly into a rifle, if military specifications are met.

We claim:

1. A method for remotely refurbishing a contrivance, said method comprising the steps of:
    identifying a contrivance that is remotely situated;
    delivering an apparatus to within the proximity of the contrivance, said apparatus comprising
    a contrivance mounting means,
    at least one robotic arm for automatedly disassembling the contrivance,
    a means for cleaning contrivance components,
    a means for checking the specifications of a contrivance component,
    at least one welding and cutting instrument for refurbishing said contrivance and replacing or cleaning components not within said specifications, and,
    a means for reassembling the contrivance; and
    operating the apparatus to refurbish the contrivance.

2. An apparatus for remotely cleaning a rifle, comprising:
    a rifle mounting means;
    at least one robotic arm for automatedly disassembling a rifle;
    a means for cleaning rifle components;
    a means for checking the specifications of a rifle component;
    at least one welding and cutting instrument for refurbishing said rifle and replacing or cleaning components not within said specifications; and,
    a means for reassembling a rifle.

3. The apparatus of claim 2 wherein said rifle mounting means are a stand having a mounting bracket.

4. The apparatus of claim 2 wherein at least one robotic arm for automatedly disassembling a rifle comprises a 6-axis robotic arm commanded by computer program code.

5. The apparatus of claim 2 wherein the means for cleaning rifle components are at least one ultrasonic cleaning tub.

6. The apparatus of claim 2 wherein the means for checking the specifications of a rifle component are at least one coordinate measuring machine.

7. The apparatus of claim 2 wherein at least one welding and cutting instrument for refurbishing said rifle and replacing or cleaning components not within said specifications comprises: at least one 6-axis robotic arm commanded by computer program code; and at least one multi-level rotating bin commanded by computer program code.

8. The apparatus of claim 2 wherein the means for reassembling a rifle are at least one 6-axis robotic arm commanded by computer program code.

9. The apparatus of claim 2 wherein: said rifle mounting means are a stand having a mounting bracket; the at least one robotic arm for automatedly disassembling a rifle comprises at least one 6-axis robotic arm commanded by computer program code; the means for cleaning rifle components are at least one ultrasonic cleaning tub; the means for checking the specifications of a rifle component are at least one coordinate measuring machine; said at least one welding and cutting instrument for refurbishing said rifle and replacing or cleaning components not within said specifications comprising: the 6-axis robotic arm commanded by computer program code, and at least one multi-level rotating bin commanded by computer program code.

10. A method of cleaning a rifle comprising the steps of:
    delivering an apparatus for remotely cleaning a rifle, said apparatus comprising a rifle mounting means, at least one robotic, arm for automatedly disassembling a rifle, a means for cleaning rifle components, a means for checking the specifications of a rifle component, at least one welding and cutting instrument for refurbishing said rifle and replacing or cleaning components not within said specifications, and a means for reassembling a rifle;
    providing a power source to said apparatus;
    providing a rifle to said rifle mounting means;
    disassembling said rifle into an upper assembly, a charging handle plus bolt carrier group, and a lower assembly;
    cleaning said upper assembly, said charging handle plus bolt carrier group, and said lower assembly via said means for cleaning rifle components;
    checking the specifications of said upper and lower assemblies via said means for checking the specifications and tolerances of a rifle component; and,
    reassembling said upper assembly, said charging handle plus bolt carrier group, and said lower assembly into a rifle, if target specifications are met.

11. The method of claim 10 wherein at least one robotic arm for automatedly disassembling a rifle comprises a 6-axis robotic arm commanded by computer program code.

12. The method of claim 10 wherein the means for cleaning rifle components are at least one ultrasonic cleaning tub.

13. The method of claim 10 wherein the means fear checking the specifications of a rifle component are at least one coordinate measuring machine.

14. The method of claim 10 wherein at least one welding and cutting instrument for refurbishing said rifle and replacing or cleaning components not within said specifications comprises: at least one 6-axis robotic arm commanded by computer program code; and at least one multi-level rotating bin commanded by computer program code.

15. The method of claim 10 wherein the means for reassembling a rifle are at least one 6-axis robotic arm commanded by computer program code.

16. The method of claim 10 wherein: said rifle mounting means are a stand having a mounting bracket; the at least one robotic arm for automatedly disassembling a rifle comprises at least one 6-axis robotic arm commanded by computer program code; the means for cleaning rifle components are at least one ultrasonic cleaning tub; the means for checking the specifications of a rifle component are at least one coordinate measuring machine; said at least one welding and cutting instrument for refurbishing said rifle and replacing or cleaning components not within said specifications comprises: the 6-axis robotic arm commanded by computer program code, and at least one multi-level rotating bin commanded by computer program code.

17. The method of claim 1 wherein at least one robotic arm for automatedly disassembling a contrivance is a 6-axis robotic arm commanded by computer program code.

18. The method of claim 1 wherein the means for cleaning contrivance components are at least one ultrasonic cleaning tub.

19. The method of claim 1 wherein the means for checking the specifications of a contrivance component are at least one coordinate measuring machine.

20. The method of claim 1 wherein said at least one welding and cutting instrument for refurbishing said contrivance and replacing or cleaning components not within said specifications comprises:
- at least one 6-axis robotic arm commanded by computer program code;
- and, at least one multi-level rotating bin commanded by computer program code.

\* \* \* \* \*